(12) United States Patent
Chien

(10) Patent No.: US 6,606,672 B1
(45) Date of Patent: Aug. 12, 2003

(54) SINGLE-CHIP-BASED ELECTRONIC APPLIANCE USING A DATA BUS FOR READING AND WRITING DATA CONCURRENTLY

(75) Inventor: Cheng-Pang Chien, Hsin-Chu (TW)

(73) Assignee: Mustek Systems Inc., Hsin-Chu (TW)

( * ) Notice: Subject to any disclaimer, the term of this patent is extended or adjusted under 35 U.S.C. 154(b) by 369 days.

(21) Appl. No.: 09/640,014

(22) Filed: Aug. 17, 2000

Related U.S. Application Data

(63) Continuation-in-part of application No. 09/089,934, filed on Jun. 3, 1998.

(51) Int. Cl.[7] .............................................. G06F 13/00
(52) U.S. Cl. ................... 710/21; 710/7; 710/22
(58) Field of Search ................... 710/7, 20–28, 710/305

(56) References Cited

U.S. PATENT DOCUMENTS

| | | | | |
|---|---|---|---|---|
| 4,283,760 A | * | 8/1981 | Kita et al. ................. | 710/31 |
| 4,309,755 A | * | 1/1982 | Lanty ........................ | 710/21 |
| 4,821,174 A | * | 4/1989 | Webb et al. ............... | 710/107 |
| 4,924,427 A | * | 5/1990 | Savage et al. ............. | 710/26 |
| 5,206,935 A | * | 4/1993 | Sinks et al. ................ | 710/29 |
| 5,235,685 A | * | 8/1993 | Caldara et al. ............ | 710/313 |
| 5,303,354 A | * | 4/1994 | Higuchi et al. ............ | 712/218 |
| 5,446,877 A | * | 8/1995 | Liu et al. ................... | 714/1 |
| 5,748,913 A | * | 5/1998 | Shibahara .................. | 710/301 |
| 5,867,733 A | * | 2/1999 | Meyer ........................ | 710/74 |
| 5,898,891 A | * | 4/1999 | Meyer ........................ | 710/33 |
| 5,913,028 A | * | 6/1999 | Wang et al. ............... | 709/203 |

* cited by examiner

*Primary Examiner*—Sumati Lefkowitz
(74) *Attorney, Agent, or Firm*—Winston Hsu

(57) ABSTRACT

An electronic or information appliance, for example an LCD projector, air-conditioner or washing machine, which can use a data bus to read and write data at the same time. The electronic or information appliance comprises a data bus for transmitting data, an input device electrically connected with the data bus for providing data, an output device electrically connected with the data bus for receiving data, and a micro-controller electrically connected with the data bus for controlling the input device and output device. When the micro-controller reads a datum from the input device through the data bus, it writes the datum to the output device through the data bus at the same time to increase a data transmission speed between the input device and the output device.

11 Claims, 5 Drawing Sheets

| Item | Processor | Micro-Controller |
|---|---|---|
| External-Memory size | Large | Small |
| Internal-Memory (RAM) | Hardly any internal RAM | Several K-bytes internal RAM |
| Internal-Memory (ROM) | Hardly any internal ROM | Several K-bytes internal ROM |
| I/O ability | Obtain I/O ability only when working with other external IC | Own self I/O ability |
| Extra-IC number | Execute normal instructions with the help of at least 3~5 extra-ICs | Can execute instructions even without any other extra-IC |
| DMA | Can perform DMA function with the help of a DMA controller | Can not perform DMA function |
| A/D BUS | Not directly connect with memory or I/O. All the memory or I/O control must be done via some bridge ICs. | Directly connect with memory, I/O or other ICs. |
| System | Used in an extensible system, such as PC | Used in home appliances, information appliances |

Fig. 8

SINGLE-CHIP-BASED ELECTRONIC APPLIANCE USING A DATA BUS FOR READING AND WRITING DATA CONCURRENTLY

This is a continuation-in-part of Ser. No. 09/089,934, filed Jun. 3, 1998.

BACKGROUND OF THE INVENTION

1. Field of the Invention

The present invention relates to a single-chip-based electronic appliance, and more particularly, to an electronic appliance which utilizes only a single chip micro-controller, however can use a data bus to read and write data at the same time for increasing a data transmission speed.

2. Description of the Prior Art

A prior art personal computer system commonly uses DMA (Direct Memory Access) to speed up data transmissions between various computer peripherals. Although DMA can effectively increase a data transmission speed, it has to work with a DMA compatible CPU (central processing unit) and peripheral circuits. The specific component requirements make the circuits and the control of the computer system very complicated and expensive. If data between peripheral circuits are transmitted by a traditional CPU incompatible with the DMA, the CPU has to read data one by one from a peripheral circuit, store each of the data in a register, and then write it to another peripheral circuit. Moreover, the read and write of each of the data require a change of data address of an address bus which results in a long data transmission process.

Please refer to FIG. 1. FIG. 1 is a structural diagram of a conventional DMA controller 70 according to the prior art. When a data is transferring from a memory 72 to a memory 74, an address signal indicative of a transfer origin is outputted from a DMA controller 70 to the memory 72 via an address bus 76, and an address signal indicative of a transfer destination is outputted from the DMA controller 70 to the memory 74 via an address bus 78. When a read signal fed to the memory 72 from DMA controller 70 via a signal line 80 becomes active, data stored in the memory 72 are read out onto a data bus 84, and simultaneously, a write signal fed to the memory 74 from the DMA controller 70 via a signal line 82 becomes active. Thus, the data read out onto the data bus 84 are written in the memory 74. In this fashion, the data transfer from the memory 72 to the memory 74 is completed during one cycle.

As described above, the DMA controller 70 can effectively increase a data transmission speed between the memory 72 and memory 74. But there must be a DMA compatible CPU 90 supporting the DMA controller 70 to make it happen. Therefore, it is not possible for any type of the CPU to have a fast data transmission speed by applying the DMA controller 70. For example, many single-chip-based micro-controllers are utilized in electronic appliances or information appliances (IA), such as washing machine, air-conditioner, burglar-proof device, LCD projector, etc. Unlike the processors in the personal computers, the micro-controllers do not perform bulky and sophisticated calculation. Therefore, such electronic or information appliances accommodate only a micro-controller, instead of a processor, so that the cost can be saved and reduced.

Please refer to FIG. 8. FIG. 8 demonstrates the difference between a processor and a micro-controller. A processor is usually utilized in an extensible system, such as personal computer. There is hardly any RAM and ROM accommodated inside the processor, so large-size extra memory is required to help to achieve massive calculation. Without I/O function built inside, outside ICs (amounting to 3~5 ICs) must be employed even to carry out a simple instruction or to execute I/O functions. A micro-controller is not connected to the memory or I/O devices. All the memory or I/O controls are performed via the bridge ICs or the DMA controller. However, a micro-controller is usually utilized in electronic appliances, such as an air conditioner, or a washing machine, etc. There are built-in RAM and ROM with several K-bytes memory capacities. No or little extra memory is required. With I/O function built inside, the micro-controller is directly connected to the memory or I/O devices. All the memory or I/O controls are performed without extra ICs or the DMA controller.

In comparison with the processor of a personal computer system, the micro-controller is usually utilized in a less complicated system without sophisticated control instructions to be executed. However, there are more and more chances in the system installed with the micro-controller that massive data transfer is carried out. For example, in the projector, a large quantity of images is sent to the output module to be projected onto the wall. Or in modern home appliances, especially those with Internet communication ability, massive data are to be sent to the graphic module for further image demonstration. To achieve these purposes, massive data transfer must be carried out.

However, in a single-chip micro-controller, it does not support DMA capability. Therefore, when a massive data transfer is required, a long data transmission process would also follow, which results in time-consuming and inconvenience.

SUMMARY OF THE INVENTION

It is therefore a primary objective of the present invention to provide an electronic or information appliance with only a simple micro-controller, instead of a powerful processor, but still can perform massive data transfer with efficiency, to solve the above mentioned problems.

In a preferred embodiment, the present invention provides a single-chip based electronic appliance comprising:

a data bus for transmitting data;

an input device electrically connected with the data bus for providing data;

an output device electrically connected with the data bus for receiving data, the output device comprising a device enable pin for controlling the on and off status of the output device; and a micro-controller electrically connected with the data bus for controlling the input device and output device;

an address bus electrically connected with the micro-controller; and a position decoder electrically connected between the address bus and the device enable pin of the output device; wherein when an address outputted by the micro-controller to the address bus is a predetermined address, the position decoder triggers the output device by using the device enable pin of the output device so that when the micro-controller reads a datum from the input device through the data bus, it writes the datum to the output device through the data bus in one instruction cycle to increase a data transmission speed between the input device and the output device.

It is an advantage of the present invention that the present electronic appliance can use a traditional single-chip mircocontroller to read and write data concurrently between different memories or I/O ports by using a data bus so as to increase a data transmission speed between them.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 8 is a table which demonstrates the difference between a processor and a micro-controller.

DETAILED DESCRIPTION OF THE PREFERRED EMBODIMENT

Figure 1:
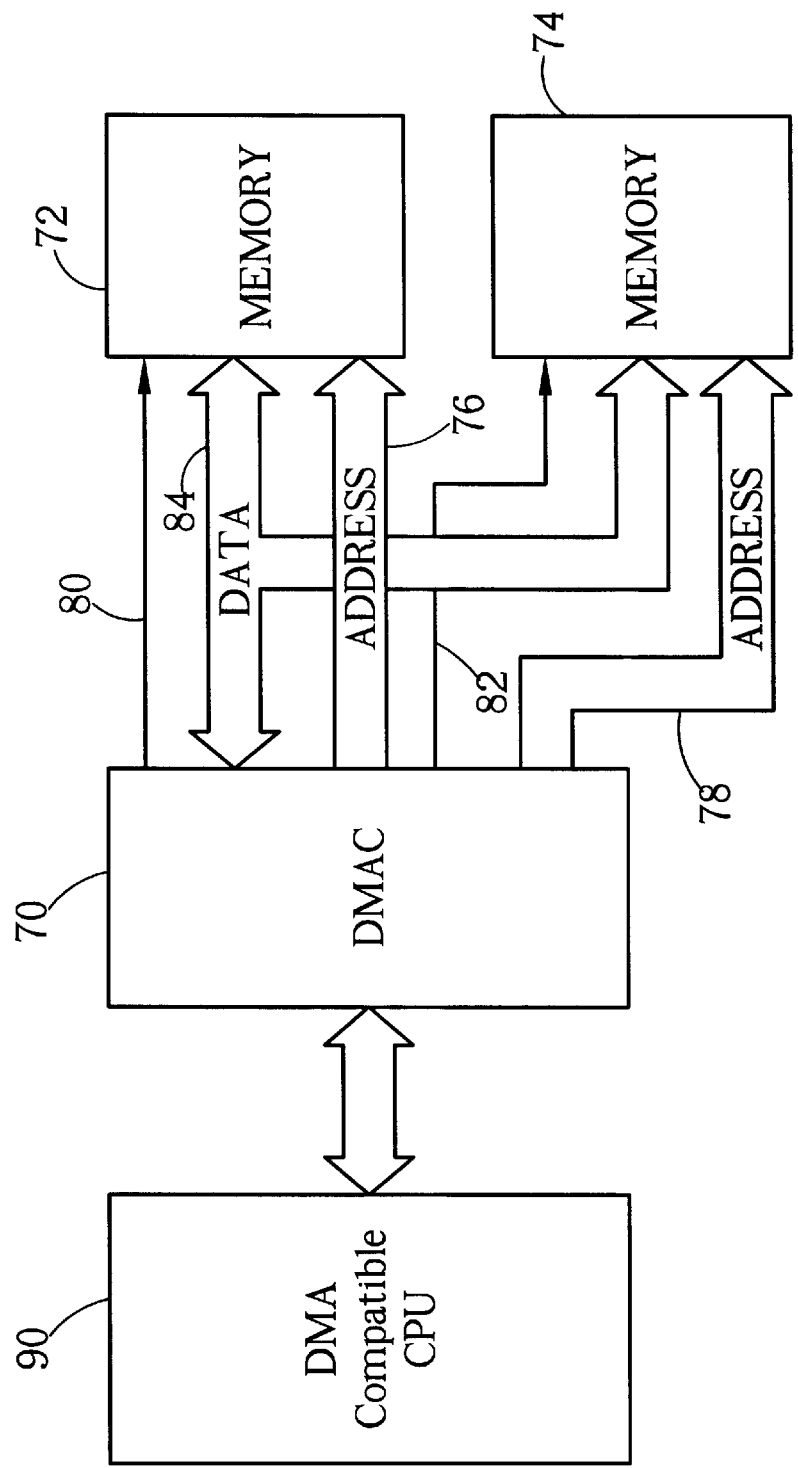
FIG. 1 is a structural diagram of a conventional DMA controller according to the prior art.
Figure 2:
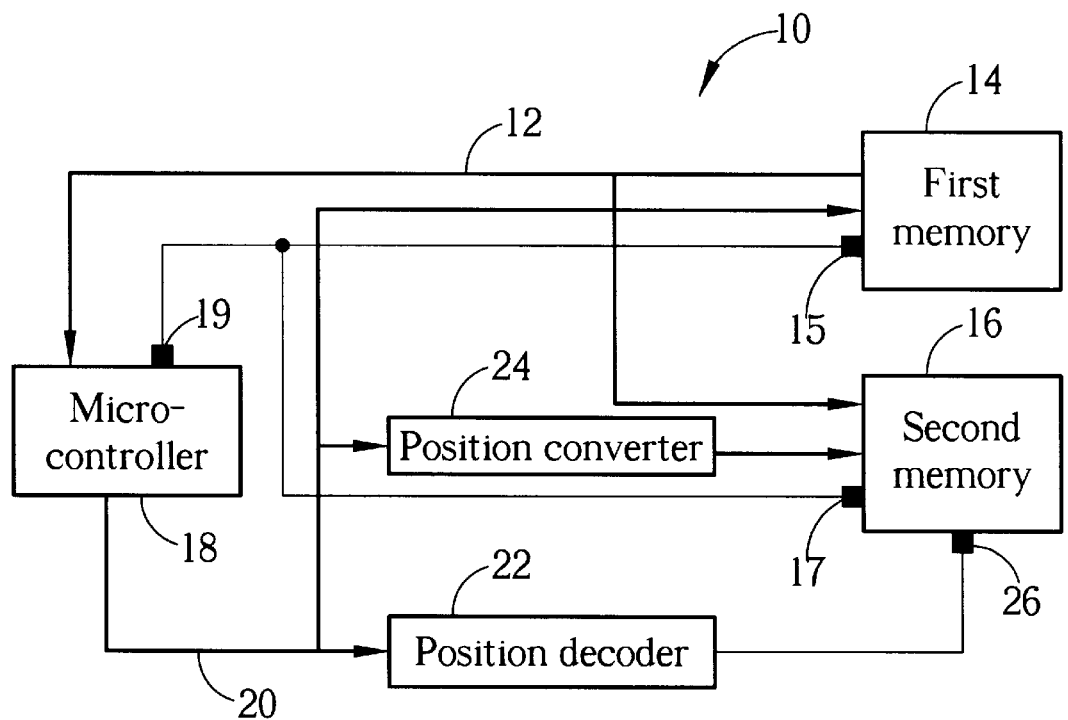
FIG. 2 is a function block diagram of a electronic appliance according to the present invention.

Please refer to FIG. 2. FIG. 2 is a function block diagram of an electronic appliance 10 according to the present invention. The electronic appliance 10 comprises a micro-controller 18, a first memory 14, a second memory 16, a position converter 24, and a position decoder 22. The electronic appliance 10 further comprises a data bus 12 electrically connecting the micro-controller 18, the first memory 14 and the second memory 16 for transmitting data, and an address bus 20 electrically connecting the micro-controller 18, the first memory 14 and the position converter 24 for transmitting data addresses outputted by the first memory 14 through the micro-controller 18. The position converter 24 is an adder or subtracter electrically connected between the address bus 20 and the second memory 16 for adding or subtracting an address transmitted from the address bus 20 by a predetermined address difference to generate a data input address of the second memory 16.

The first memory 14 comprises a read enable pin 15 for controlling data output of the first memory 14. When the read enable pin 15 is triggered, the first memory 14 will output a datum stored in an address transmitted from the address bus 20 to the data bus 12. The second memory 16 comprises a write enable pin 17 for controlling data input of the second memory 16. When the write enable pin 17 is triggered, the second memory 16 will input a datum from the data bus 12 to a data input address generated by the position converter 24. The read enable pin 15 of the first memory 14 and the write enable pin 17 of the second memory 16 are interconnected with the control pin 19 of the micro-controller 18 so that the micro-controller 18 can use the control pin 19 to simultaneously trigger a read of the first memory 14 and a write of the second memory 16.

The second memory 16 further comprises a device enable pin 26 electrically connected to the position decoder 22 for controlling the on and off status of the second memory 16. The position decoder 22 is electrically connected between the address bus 20 and the device enable pin 26 of the second memory 16. When the address of the datum outputted from the first memory 14 through the address bus 20 is in a predetermined first position section, the position decoder 22 will trigger the second memory 16 by using the device enable pin 26 of the second memory 16.

Figure 3:
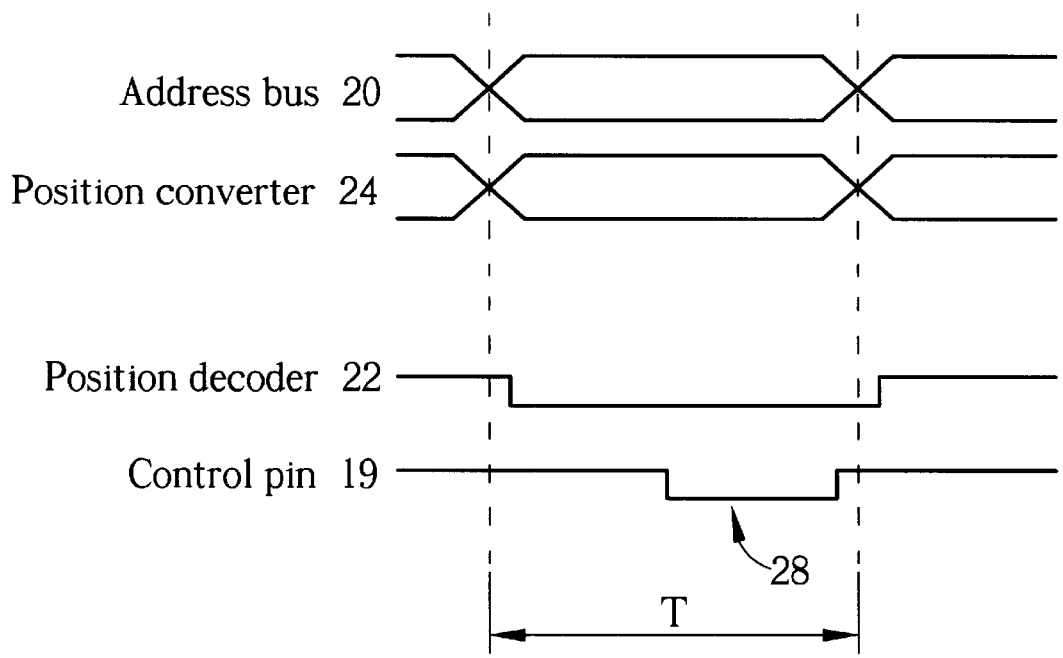
FIG. 3 is a timing diagram of the electronic appliance shown in FIG. 2.

Please refer to FIG. 3. FIG. 3 is a timing diagram illustrating when the micro-controller 18 reads a datum stored in the first position section of the first memory 14. The timing diagram comprises the output time in which the micro-controller 18 outputs to the address bus 20, the output time of the position converter 24, the output of the position decoder 22, and the output of the control pin 19 of the micro-controller 18. T stands for one instruction cycle executed by the micro-controller 18. The output of the position decoder 22 is the input of the device enable pin 26 of the second memory 16. A logic 1 stands for off, and a logic 0 stands for on. The output of the control pin 19 of the micro-controller 18 is the input of the read enable pin 15 of the first memory 14 and the input of the write enable pin 17 of the second memory 16.

When the micro-controller 18 reads a datum stored in the first position section of the first memory 14, the micro-controller 18 will pass the address of the datum to the address bus 20. When the position decoder 22 detects that the datum is read from the first position section, the position decoder 22 will output a logic 0 to the device enable pin 26 of the second memory 16 to trigger the second memory 16, and the position converter 24 will automatically convert the address in the address bus 20 into a correspondent address in a second position section of the second memory 16. Afterward, the micro-controller 18 will use the control pin 19 to output a logic 0 reading signal 28 to trigger the read enable pin 15 of the first memory 14 and the write enable pin 17 of the second memory 16, and the datum will be read from the first memory 14 and directly written to the second memory 16. As shown in FIG. 3, the micro-controller 18 only takes one instruction cycle to read a datum from the first memory 14 and write the datum to the second memory 16.

When the electronic appliance 10 needs to transmit the first position section of the first memory 14 to the second position section of the second memory 16, the micro-controller 18 can store a position difference between the first position section and the second position section in the position converter 24 and store a position and length of the first position section in the position decoder 22. The micro-controller 18 only needs to read data from the first position section of the first memory 14 one by one by using the address bus 20 and data bus 12, and write them to correspondent addresses in the second position section of the second memory 16 in the same order.

Figure 4:
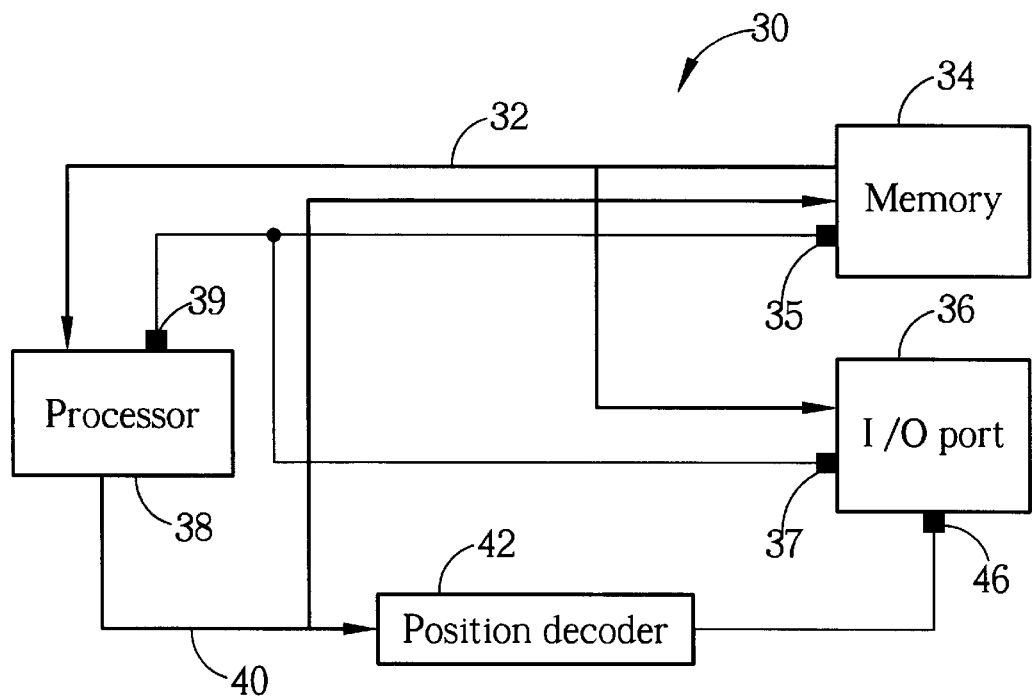
FIG. 4 is a function block diagram of an alternative electronic appliance according to the present invention.

Please refer to FIG. 4. FIG. 4 is a function block diagram of an alternative electronic appliance 30 according to the present invention. The electronic appliance 30 comprises a micro-controller 38, a memory 34, an I/O port 36, and a position decoder 42. The electronic appliance 30 further comprises a data bus 32 electrically connecting the micro-controller 38, the memory 34 and the I/O port 36 for transmitting data, and an address bus 40 electrically connecting the micro-controller 38, the memory 34 and the position decoder 42 for transmitting data addresses of the memory 34 outputted from the micro-controller 38.

The memory 34 comprises a read enable pin 35 for controlling data output of the memory 34. When the read enable pin 35 is triggered, the memory 34 will output a datum to the data bus 32 according to an address of the datum transmitted from the address bus 40. The I/O port 36 comprises a write enable pin 37 for controlling data output of the I/O port 36. When the write enable pin 37 is triggered, the I/O port 36 will output the datum in the data bus 32. The read enable pin 35 of the memory 34 and the write enable pin 37 of the I/O port 36 are interconnected with the control pin 39 of the micro-controller 38 so that the micro-controller 38 can use the control pin 39 to simultaneously trigger a read of the memory 34 and an output of the I/O port 36.

The I/O port 36 further comprises a device enable pin 46 electrically connected with the position decoder 42 for controlling the on and off status of the I/O port 36. The position decoder 42 is electrically connected between the address bus 40 and the device enable pin 46 of the I/O port 36. When an address of a datum transmitted from the memory 34 through the address bus 40 is in a predetermined first position section, the position decoder 42 will trigger the I/O port 36 by using the device enable pin 46 of the I/O port 36.

Figure 5:
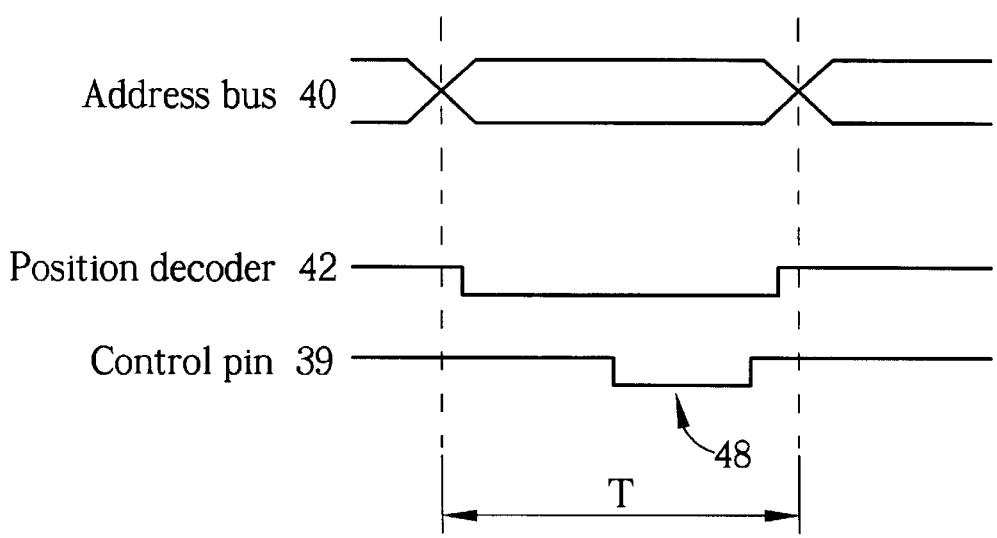
FIG. 5 is a timing diagram of the electronic appliance shown in FIG. 4.

Please refer to FIG. 5. FIG. 5 is a timing diagram when the micro-controller 38 reads a datum in the first position section of the memory 34. The timing diagram comprises the output time in which the micro-controller 38 outputs to the address bus 40, the output of the position decoder 42, and the output of the micro-controller 38 over the control pin 39. T stands for one instruction cycle executed by the micro-controller 38. When the micro-controller 38 reads a datum in the first position section of the memory 34, the micro-controller 38 will transmit an address of the datum to the address bus 40. When the position decoder 42 detects that the address on the address bus 40 is in the first position section, it will generate a logic 0 to the device enable pin 46 of the I/O port 36 to trigger the I/O port 36, and the micro-controller 38 will output a logic 0 read signal 48 through the control pin 39 to trigger the read enable pin 35 of the memory 34 and the write enable pin 37 of the I/O port 36. During this time, the datum will be read from the memory 34 and outputted directly from the I/O port 36. FIG. 4 shows that it only takes the micro-controller 38 one instruction cycle to read a datum from the memory 34 and output the datum from the I/O port 36.

When the electronic appliance 30 needs to output the first position section of the memory 34 from the I/O port 36, the micro-controller 38 can store an address and length of the first position section in the position decoder 42, then read data stored in the first position section of the memory 34 one by one by using the address bus 40 and data bus 32, and output the data from the I/O port 36 in the same order.

Figure 6:
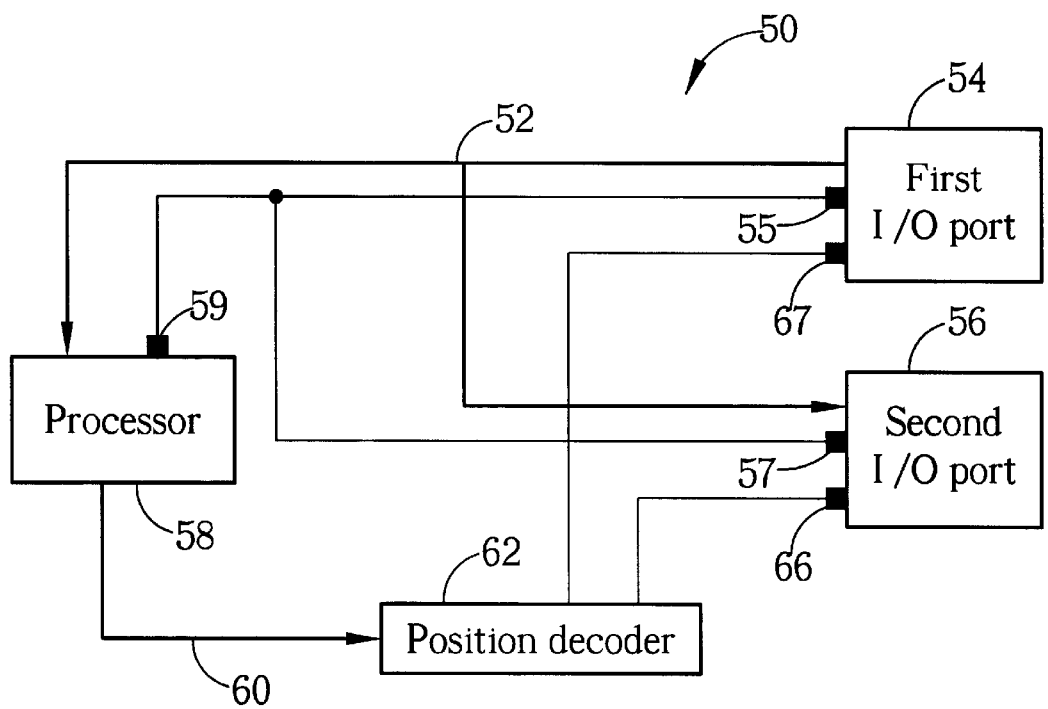
FIG. 6 is a function block diagram of another electronic appliance according to the present invention.

Please refer to FIG. 6. FIG. 6 is a function block diagram of another electronic appliance 50 according to the present invention. The electronic appliance 50 comprises a micro-controller 58, a first I/O port 54, a second I/O port 56, and a position decoder 62. The electronic appliance 50 further comprises a data bus 52 electrically connecting the micro-controller 58, the first I/O port 54 and the second I/O port 56 for transmitting data, and an address bus 60 electrically connecting the micro-controller 58 and the position decoder 62 for transmitting an address of each of the I/O ports 54, 56.

The first I/O port 54 comprises a read enable pin 55 for controlling data output of the first I/O port 54. When the read enable pin 55 is triggered, the first I/O port 54 will output a datum to the data bus 52. The second I/O port 56 comprises a write enable pin 57 for controlling data output of the second I/O port 56. When the write enable pin 57 is triggered, the second I/O port 56 will output the datum in the data bus 52. The read enable pin 55 of the first I/O port 54 and the write enable pin 57 of the second I/O port 56 are interconnected with the control pin 59 of the micro-controller 58 so that the micro-controller 58 can use the control pin 59 to simultaneously trigger an input of the first I/O port 54 and an output of second I/O port 56.

The first I/O port 54 further comprises a device enable pin 67 electrically connected with the position decoder 62 for controlling the on and off status of the first I/O port 54. The second I/O port 56 further comprises a device enable pin 66 electrically connected with the position decoder 62 for controlling the on and off status of the second I/O port 56. The position decoder 62 electrically connects the address bus 60, the device enable pin 67 of the first I/O port 54 and the device enable pin 66 of the second I/O port 56. When an address transmitted from the address bus 60 is the address of the first I/O port 54, the position decoder 62 will trigger the first I/O port 54 by using the device enable pin 67 of the first I/O port 54 and trigger the second I/O port 56 by using the device enable pin 66 of the second I/O port 56.

Figure 7:
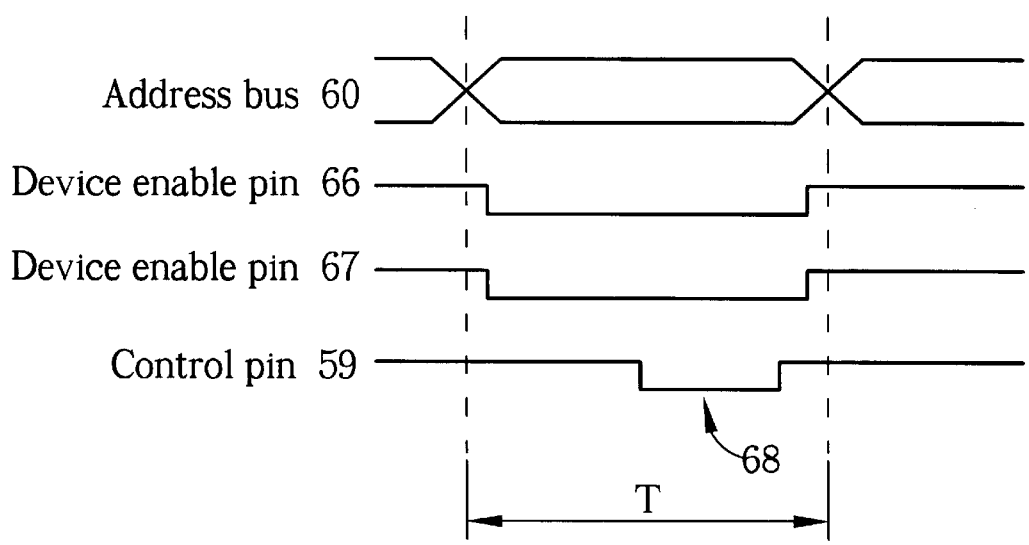
FIG. 7 is a timing diagram of the electronic appliance shown in FIG. 6.

Please refer to FIG. 7. FIG. 7 is a timing diagram when a datum is transmitted from the first I/O port 54 to the second I/O port 56 by the micro-controller 58. The timing diagram comprises the output time in which the micro-controller 58 outputs to the address bus 60, the output of the position decoder 62 to the device enable pins 66 and 67, and the output of the micro-controller 58 over the control pin 59. T stands for one instruction cycle executed by the micro-controller 58. When the micro-controller 58 transmits a datum in the first I/O port 54 to the second I/O port 56, the micro-controller 58 will transmit the address of the first I/O port 54 to the address bus 60. When the position decoder 62 detects that the address in the address bus 60 is the address of the first I/O port 54, it will generate a logic 0 to the device enable pin 67 of the first I/O port 54 to enable the first I/O port 54 and the device enable pin 66 of the second I/O port 56 to enable the second I/O port 56, then the micro-controller 58 will use the control pin 59 to output a logic 0 read signal 68 to trigger the read enable pin 55 of the first I/O port 54 and the write enable pin 57 of the second I/O port 56. During this time, the datum will be inputted from the first I/O port 54 and outputted from the second I/O port 56 directly. FIG. 7 shows that it only takes the micro-controller 58 one instruction cycle to input a datum from the first I/O port 54 and to output the datum from the second I/O port 56.

To sum up, in prior arts, though the processor utilized in the personal computer system possesses DMA ability to transfer massive data between different peripherals or I/O ports, it can only perform DMA function with the help of the DMA controller or other compatible ICs, which consequently results in high cost. In electronic or information appliances, a single-chip-based micro-controller is utilized instead of a processor because of the specification and cost concern. However, the problem of massive data transfer become critical in such micro-controller electronic appliances when such appliances are intentionally designed for or upgraded to be information appliances required to processing massive data transfer.

In comparison with the prior arts, the present invention provide a solution so as to allow the electronic appliance to remain the usage of a low-cost traditional single-chip micro-controller, however possesses the ability to increase the data transmission speed when massive data transfer is necessary. In a dominant era of modern information appliance (IA) nowadays, the present invention helps to solve, in a cost-effective way, the underlying problem of massive data transfer in the IA industry, which would otherwise be critical and troublesome when all kinds of IA products are to be promoted.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A single-chip based electronic appliance comprising:
   a data bus for transmitting data;
   an input device electrically connected with the data bus for providing data;
   an output device electrically connected with the data bus for receiving data, the output device comprising a device enable pin for controlling the on and off status of the output device;
   a micro-controller electrically connected with the data bus for controlling the input device and output device; an address bus electrically connected with the micro-controller; and
   a position decoder electrically connected between the address bus and the device enable pin of the output device; wherein when an address outputted by the micro-controller to the address bus is a predetermined address, the position decoder triggers the output device by using the device enable pin of the output device so that when the micro-controller reads a datum from the input device through the data bus, it writes the datum to the output device through the data bus in one instruction cycle to increase a data transmission speed between the input device and the output device.

2. The electronic appliance of claim 1 wherein the datum is read to the micro-controller through the data bus, and written to the output device through the data bus concurrently in one instruction cycle.

3. The electronic appliance of claim 2 wherein the input device comprises a read enable pin electrically connected to the micro-controller, and the output device comprises a write enable pin electrically connected to the micro-controller wherein when reading the datum from the input device, the micro-controller triggers the read enable pin of the input device and the write enable pin of the output device concurrently so that the datum is written to the output device through the data bus in one instruction cycle.

4. The electronic appliance of claim 3 wherein the read enable pin of the input device is electrically connected with the write enable pin of the output device so that the micro-controller triggers both pins at the same time.

5. The electronic appliance of claim 1 wherein the micro-controller possesses no DMA (Direct Memory Access) ability.

6. The electronic appliance of claim 1 wherein when the address outputted by the micro-controller to the address bus is within a predetermined address range, the position decoder uses the device enable pin of the output device to trigger the output device.

7. The electronic appliance of claim 1 wherein the input device further comprises a device enable pin electrically connected with the position decoder for controlling the on and off status of the input device, when the address outputted by the micro-controller to the address bus is a predetermined address, the position decoder concurrently triggers the input device and the output device by using the two device enable pins so that the micro-controller reads a datum from the input device through the data bus and writes the datum to the output device through the data bus in one instruction cycle.

8. The electronic appliance of claim 1 wherein the input device is a first memory, and the address bus is electrically connected with the first memory, and wherein when the micro-controller outputs the predetermined address to the address bus and reads the datum from the first memory through the data bus, the position decoder triggers the output device so that the datum is written to the output device through the data bus in one instruction cycle.

9. The electronic appliance of claim 8 wherein the output device is a second memory, and the electronic appliance further comprises a position converter electrically connected between the second memory and the address bus for converting the address transmitted from the address bus and inputting the converted address to the second memory as a datum input address, wherein when the micro-controller outputs the predetermined address to the address bus so as to read the datum from the first memory, the position decoder triggers the second memory so that the datum is concurrently written to the converted address in the second memory.

10. The electronic appliance of claim 9 wherein the position converter is an adder or a subtracter for adding or subtracting the address transmitted from the address bus by a predetermined address difference to generate the data input address of the second memory.

11. The electronic appliance of claim 1 wherein the input device is an input port for inputting the datum, and the output device is an output port for outputting the datum.

* * * * *